US012665749B2

(12) United States Patent
Griffin et al.

(10) Patent No.: US 12,665,749 B2
(45) Date of Patent: Jun. 23, 2026

(54) MIGRATING SECRETS FROM A CLOUD ENVIRONMENT TO A LOCAL SYSTEM

(71) Applicant: RED HAT, INC., Raleigh, NC (US)

(72) Inventors: Leigh Griffin, Waterford (IE); Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 174 days.

(21) Appl. No.: 18/116,995

(22) Filed: Mar. 3, 2023

(65) Prior Publication Data

US 2024/0297782 A1      Sep. 5, 2024

(51) Int. Cl.
H04L 9/08 (2006.01)
(52) U.S. Cl.
CPC .......... H04L 9/0825 (2013.01); H04L 9/0872 (2013.01)
(58) Field of Classification Search
None
See application file for complete search history.

(56) References Cited

U.S. PATENT DOCUMENTS

| | | | | |
|---|---|---|---|---|
| 9,262,323 | B1 * | 2/2016 | Shankaran | .......... G06F 12/0868 |
| 9,282,122 | B2 | 3/2016 | Cabrera et al. | |
| 9,467,477 | B2 | 10/2016 | Cabrera et al. | |
| 10,615,976 | B2 | 4/2020 | Sun et al. | |
| 10,819,701 | B2 | 10/2020 | Bose et al. | |
| 11,849,037 | B1 * | 12/2023 | Tong | ........................ G06F 9/541 |
| 2005/0033728 | A1 * | 2/2005 | James | ........................ G06F 8/60 |
| 2013/0212637 | A1 * | 8/2013 | Guccione | .............. H04W 12/08 726/1 |
| 2019/0258611 | A1 * | 8/2019 | Avery | ................. G06F 16/1844 |
| 2021/0132811 | A1 * | 5/2021 | Puvvada | .............. G06F 16/273 |
| 2021/0360064 | A1 * | 11/2021 | Dennis | ............... H04L 67/1095 |
| 2022/0215111 | A1 * | 7/2022 | Ekins | ................. G06F 21/6218 |
| 2023/0350583 | A1 * | 11/2023 | Murray | ................. G06F 3/0623 |
| 2024/0111731 | A1 * | 4/2024 | Jones | ................... G06F 16/162 |

OTHER PUBLICATIONS

Koivunen et al., "Secrets Management in a Multi-Cloud Kubernetes Environment", https://www.utupub.fi/bitstream/handle/10024/151776/Secrets_Management_in_a_Multi_Cloud_Kubernetes_Environment_pdf-a.pdf?sequence=1, 2021; pp. 1-63.

(Continued)

*Primary Examiner* — Younes Naji
(74) *Attorney, Agent, or Firm* — Kilpatrick Townsend & Stockton LLP

(57) ABSTRACT

Secrets can be migrated from a cloud environment to a local system. For example, a computing system can receive a secret stored in a cloud environment from a secret manager associated with the cloud environment. The computing system can identify a source location associated with the secret. The secret can map to a location identifier representing a geographic region that includes the source location of the secret. The computing system can determine that a filesystem in a physical server corresponds to the location identifier of the secret. The computing system then can store the secret in the filesystem of the physical server. The secret can be used to control access of one or more protected computing resources.

20 Claims, 3 Drawing Sheets

(56)          References Cited

OTHER PUBLICATIONS

Mwikya et al., "Secure Management of Encryption Keys for Small and Medium Enterprises in Africa: A Comparative Study", https://www.researchgate.net/profile/James-Reuben-5/publication/360342471_Secure_managment_of_encryption_keys_for_small_and_medium_enterprises_in_Africa_A_comparative_study/links/627130433a23744a726006ba/Secure-managment-of-encryption-keys-for-small-and-medium-enterprises-in-Africa-A-comparative-study.pdf, May 2022; pp. 1-19.

Hansen et al., "Securing and Managing Secrets with HashiCorp Vault Enterprise", https://aws.amazon.com/blogs/apn/securing-and-managing-secrets-with hashicorp-vault-enterprise/, Apr. 11, 2018; pp. 1-4.

Jurvanen, Karl-Juhan, "Using AWS Secrets Manager with Kubernetes", https://www.theseus.fi/bitstream/handle/10024/511401/Jurvanen_Karl-Juhan.pdf?sequence=3, Dec. 2021; pp. 1-28.

* cited by examiner

200

300

```
┌─────────────────────────────────────────────────────────────┐
│                            302                                │
│  Receive a secret stored in a cloud environment from a        │
│  secret manager associated with the cloud environment         │
└─────────────────────────────────────────────────────────────┘
                               │
                               ▼
┌─────────────────────────────────────────────────────────────┐
│                            304                                │
│  Identify a source location associated with the secret, the   │
│  source location being mappable to a location identifier      │
│  representing a geographic region that includes the source    │
│  location of the secret                                       │
└─────────────────────────────────────────────────────────────┘
                               │
                               ▼
┌─────────────────────────────────────────────────────────────┐
│                            306                                │
│  Determine that a filesystem in a physical server             │
│  corresponds to the location identifier of the secret         │
└─────────────────────────────────────────────────────────────┘
                               │
                               ▼
┌─────────────────────────────────────────────────────────────┐
│                            308                                │
│  Store the secret in the filesystem of the physical server,   │
│  the secret being usable to control access of one or more     │
│  protected computing resources                                │
└─────────────────────────────────────────────────────────────┘
```

*FIG. 3*

MIGRATING SECRETS FROM A CLOUD ENVIRONMENT TO A LOCAL SYSTEM

TECHNICAL FIELD

The present disclosure relates generally to secrets management. More specifically, but not by way of limitation, this disclosure relates to migrating secrets from a cloud environment to a local system.

BACKGROUND

Secrets are non-human privileged credentials used in computing systems to control access to protected computing resources or sensitive information, (e.g., personally identifiable information). Examples of secrets include account credentials, passwords, and application programming interface (API) keys. To prevent malicious actors from accessing the secrets, secrets are often managed using a secret manager that stores the secrets in a central location (e.g., a cloud environment) and controls permissions to access the secrets. Components (e.g., an automation tool) of a computing system can communicate with the secret manager to obtain a secret as authentication to access the protected computing resources.

BRIEF DESCRIPTION OF THE DRAWINGS

FIG. 3 is a flowchart of a process for migrating secrets from a cloud environment to a local system according to one example of the present disclosure.

DETAILED DESCRIPTION

Figure 1:
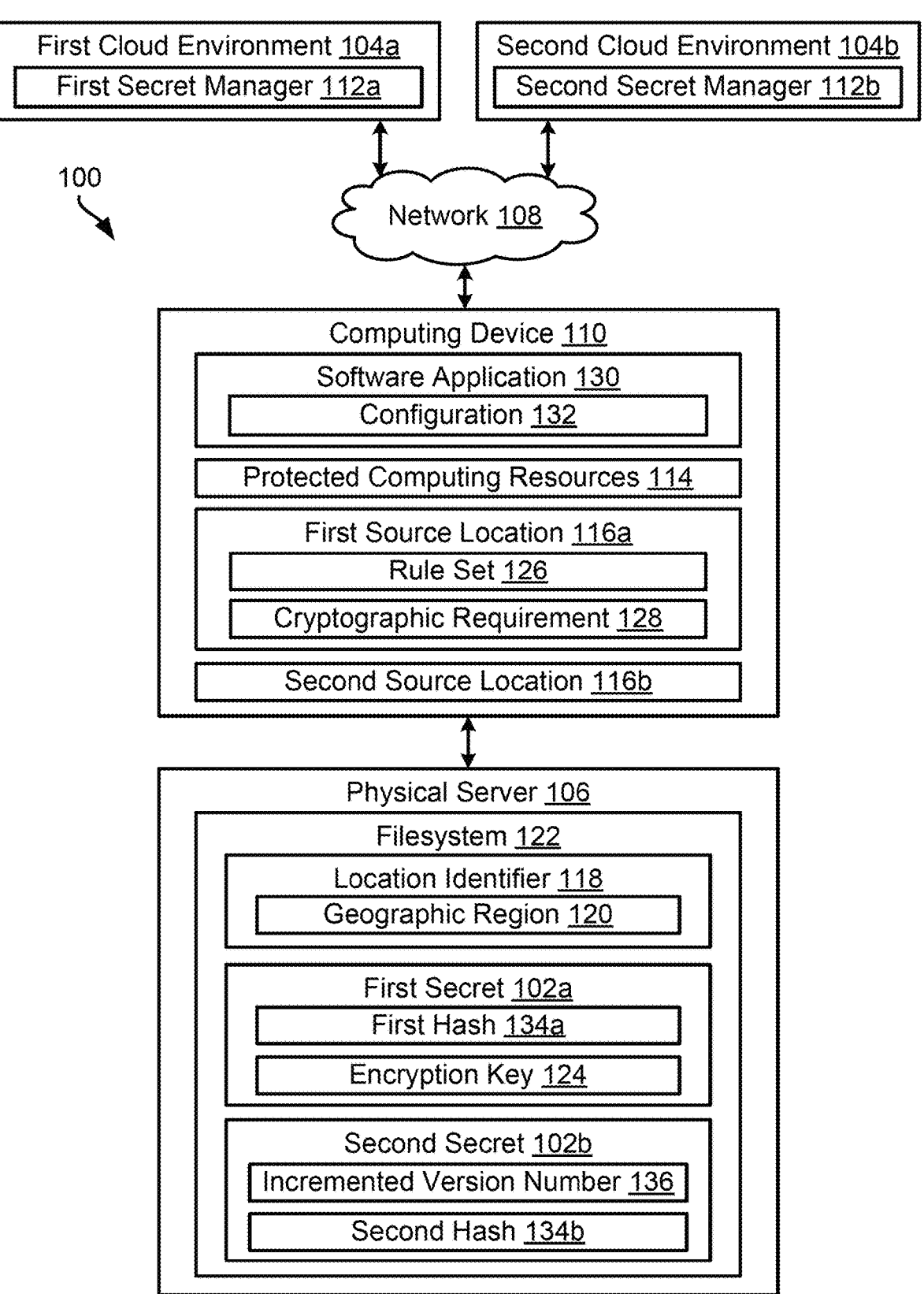
FIG. 1 is a block diagram of an example of a computing environment for migrating secrets from a cloud environment to a local system according to one example of the present disclosure.

Cloud computing can enable flexibility in device and location with respect to accessing computing resources. But, using cloud environments can introduce security risks, for example when configuration management is controlled by multiple users. A misconfigured cloud environment with public write access can result in data loss or security breaches by malicious actors. Some jurisdictions have passed laws or regulations requiring users to store sensitive information (e.g., biometric data, passwords, or personally identifying information) in certain ways that improve security and privacy protections. Accordingly, the users may implement reverse cloud migration or cloud repatriation to move away from using the cloud environments to instead use on-premise infrastructure. But, to avoid vendor lock-in caused by using a sole cloud provider, the users may have employed a hybrid cloud environment that uses infrastructure from multiple cloud providers. Migrating away from the hybrid cloud environment to improve privacy protections can be complicated by merging the multiple cloud providers in the on-premise infrastructure, for example with respect to preserving topology of the cloud ecosystem.

Some examples of the present disclosure can overcome one or more of the issues mentioned above by migrating secrets from cloud environments to a local system such that the secrets are stored in an on-premise computing environment, such as a physical server. The secrets can include digital authentication credentials (e.g., passwords, tokens, certificates, etc.) used to control access to one or more protected computing resources. Using the on-premise computing environment can afford greater security protection compared to using a cloud environment, enabling a user to comply with privacy protections implemented according to a respective jurisdiction associated with the secrets. For example, the on-premise computing environment may have consolidated management or predefined security parameters to enable relatively higher data privacy protections.

Migrating the secrets from the cloud environments to the on-premise computing environment can involve identifying a respective geographic location for each secret corresponding to an originating geographic location of each secret. The respective geographic location for each secret can be used to determine a filesystem in the on-premise computing environment that corresponds to each geographic location. By migrating the secrets into the filesystems, computing infrastructure of the on-premise computing environment can replicate topology of the cloud environments. For example, storing the secrets in the on-premise computing environment can replicate logical and physical separation of services and data in the cloud environments. Once the secrets are migrated to the on-premise computing environment, the secrets stored in the cloud environments may be removed to conserve computing resources, such as memory space.

In one particular example, a computing device, such as a physical server, coupled to a cloud environment can receive a secret of a token from a secret manager associated with the cloud environment. The computing device then can identify a source location associated with the token that corresponds to an originating geographic location of the token. Data privacy protections may vary depending on the originating geographic location of the token. For example, the General Data Protection Regulation (GDPR) regulates data protection and privacy for countries in the European Union (EU). Using a location identifier mapping to the source location of the token, the computing device can determine that a filesystem corresponding to the location identifier exists in the physical server. In some examples, the location identifier can be a shorthand designation or an acronym corresponding to a geographical region. For example, if the originating geographic location of the token is a country in the EU, the location identifier may be "EMEA" that is shorthand for Europe, the Middle East, and Africa. If the computing device determines that the filesystem corresponding to the location identifier is absent from the physical server, the computing device can generate the filesystem in the physical server. In such instances, the computing device then can store the token in the physical server after generating the filesystem.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for migrating secrets 102*a-b* from a cloud environment 104 to a local system according to one example of the present disclosure. The local system can be an on-premise computing system with a physical server 106 to store the secrets 102*a-b*. Components within the computing environment 100 may be communicatively coupled via a network 108, such as a local area network (LAN), wide area network (WAN), the Internet, or any combination thereof. For example, the computing environment 100 can include a computing device 110 communicatively coupled to a first cloud environment 104*a* and a second cloud environment 104*b* that are communicatively through the network 108.

The secrets 102*a-b* may be stored in one or more buckets in the cloud environments 104*a-b*, enabling organization and access control with respect to the secrets 102*a-b*. The computing device 110 additionally may be communicatively coupled to the physical server 106, enabling the computing device 110 to migrate the secrets 102*a-b* from the cloud environments 104*a-b* to the physical server 106. In some examples, the computing device 110 may be the physical server 106. Additionally or alternatively, the computing device 110 may communicate with a different physical server using the network 108 to migrate the secrets 102*a-b*. Examples of cloud providers that host the cloud environments 104*a-b* can include Amazon Web Services (AWS), Microsoft Azure, International Business Machines Corporation (IBM). Each cloud environment can include a respective secret manager. For example, a first secret manager 112*a* can be associated with the first cloud environment 104*a*, and a second secret manager 112*b* can be associated with the second cloud environment 104*b*.

In general, the computing device 110 can receive secrets 102*a-b* stored in the cloud environments 104*a-b* from the secret managers 112*a-b*. For example, the computing device 110 can receive a first secret 102*a* from the first secret manager 112*a*. In some instances, the computing device 110 may receive a list of secrets from each secret manager 112*a-b*. Examples of the secrets 102*a-b* can include access credentials, API keys, or other suitable sensitive information controlling access to one or more protected computing resources 114. The access credentials may include database credentials, resource credentials, application credentials, etc.

Once the computing device 110 receives the first secret 102*a*, the computing device 110 can identify a first source location 116*a* associated with the first secret 102*a*. In some examples, the first source location 116*a* can correspond to a geographic bucket location of a bucket storing the first secret 102*a* in the first cloud environment 104*a*. The geographic bucket location can be assigned to the bucket upon creating the bucket in the first cloud environment 104*a* and may correspond to a city, state, province, country, or other suitable geographic region. Additionally, the geographic bucket location may be a logical abstraction of physical resources provided in one or more physical data centers associated with a cloud provider of the first cloud environment 104*a*.

Based on the first source location 116*a*, the computing device 110 can determine a location identifier 118 that maps to the first source location 116*a*. For example, the computing device 110 can perform a lookup of a lookup table to determine the location identifier 118 that corresponds to the first source location 116*a*. The location identifier 118 can represent a geographic region 120 that includes the first source location 116*a* of the first secret 102*a*. Once the computing device 110 determines the location identifier 118, the computing device 110 can determine whether a filesystem 122 corresponding to the location identifier 118 exists in the physical server 106. The filesystem 122 may be a physical filesystem associated with hardware of the computing device 110. Additionally or alternatively, the filesystem 122 may include a virtual filesystem positioned as an abstract layer on top of a physical filesystem. If the filesystem 122 is already present in the physical server 106, the computing device 110 can store the first secret 102*a* in the filesystem 122. Alternatively, if the computing device 110 determines that the physical server 106 lacks the filesystem 122 corresponding to the location identifier 118, the computing device 110 can generate the filesystem 122 in the physical server 106. The computing device 110 then can store the first secret 102*a* in the generated filesystem 122.

Additionally, the computing device 110 may identify a cryptographic key (e.g., an encryption key 124) or another suitable cryptographic method used to encrypt the first secret 102*a* stored in the first cloud environment 104*a*. The encryption key 124 may be a symmetric encryption key. Alternatively, if the encryption key 124 involves asymmetric encryption, a pair of cryptographic keys can be generated such that a first cryptographic key (e.g., a public key) can be used to encrypt the first secret 102*a*. A second cryptographic key (e.g., a private key) can be used to decrypt the encrypted first secret 102*a*. In some examples, the computing device 110 can use the same encryption key used to encrypt the first secret 102*a* in the first cloud environment 104*a* to encrypt the first secret 102*a* stored in the filesystem 122. Alternatively, the computing device 110 may determine the encryption key 124 to encrypt the first secret 102*a* when stored in the filesystem 122 based on the first source location 116*a* of the first secret 102*a*. To determine the encryption key 124, the computing device 110 may identify a rule set 126 associated with the first source location 116*a*, for example using the location identifier 118.

The rule set 126 can define a cryptographic requirement 128 corresponding to the first source location 116*a*. The cryptographic requirement 128 may correspond to data privacy regulations associated with the first source location 116*a*. For example, a jurisdiction may require secrets 102*a-b* to be encrypted prior to data processing, for example to enable relatively higher security for personal data (e.g., name, network or physical address, etc.) accessible using the secrets 102*a-b*. As an illustrative example, the first secret 102*a* may be a database credential used to access a database storing personal identification numbers. Encrypting the database credential prior to storing in the physical server 106 can enable relatively higher data security to protect the personal identification numbers. Once the computing device 110 identifies the rule set 126, the computing device 110 can use the rule set 126 to determine the encryption key 124 to encrypt the first secret 102*a*, thus fulfilling the cryptographic requirement 128. Before storing the first secret 102*a* in the physical server 106, the computing device 110 can encrypt the first secret 102*a* using the encryption key 124.

A software application 130 may use the first secret 102*a* to access the protected computing resources 114. Specifically, the software application 130 can include code in source code of the software application 130 to retrieve the first secret 102*a*, for example using the first secret manager 112*a* or the computing device 110. The code can provide an address (e.g., a uniform resource locator (URL), Internet Protocol (IP) address, etc.) that the software application 130 uses to locate the first secret 102*a*. Additionally, the software application 130 may include a decryption key corresponding to the cryptographic key used to encrypt the first secret 102*a*. Using the decryption key, the software application 130 can decrypt the encrypted first secret 102*a* to access the protected computing resources 114 using the first secret 102*a*. In some examples, the software application 130 may executed by the computing device 110.

Once the first secret 102*a* is stored in the physical server 106, the computing device 110 can modify a configuration 132 of the software application 130. By modifying the configuration 132, the software application 130 can access the filesystem 122 of the physical server 106 to obtain the first secret 102*a* instead of retrieving the first secret 102*a* from the first cloud environment 104*a*. The configuration 132 of the software application 130 may be defined by the source code of the software application 130. In such instances, modifying the configuration 132 of the software application 130 may involve modifying the source code of the software application 130 to retrieve the first secret 102*a* from the filesystem 122. Additionally or alternatively, the computing device 110 may route network traffic away from the first cloud environment 104*a* to instead access the first secret 102*a* through the physical server 106.

In some examples, the computing device 110 may receive more than one secret to migrate to the physical server 106. For example, after receiving the first secret 102*a*, the computing device 110 can receive a second secret 102*b* from the second secret manager 112*b* associated with the second cloud environment 104*b*. In some instances, the computing device 110 may receive a list that contains the first secret 102*a* and the second secret 102*b*. Once the computing device 110 receives the second secret 102*b*, the computing device 110 can compare the second secret 102*b* to the first secret 102*a* to determine whether the second secret 102*b* is a duplicate of the first secret 102*a*. For example, the computing device 110 can compare a first hash 134 of the first secret 102*a* with a second hash 134*b* of the second secret 102*b*. The second secret 102*b* may be a duplicate of the first secret 102*a* if the first hash 134*a* is the same as the second hash 134*b*.

If the second secret 102*b* is a duplicate of the first secret 102*a*, the computing device 110 may prevent the second secret 102*b* from being stored in the physical server 106. Alternatively, if the computing device 110 determines the second secret 102*b* is not a duplicate of the first secret 102*a*, the computing device 110 may identify a second source location 116*b* associated with the second secret 102*b*. In such examples, the second source location 116*b* may map to the location identifier 118 associated with the first secret 102*a* and the filesystem 122 in the physical server 106. For example, the computing device 110 can use the second source location 116*b* to perform a lookup of a lookup table that then outputs the location identifier 118 that corresponds to the second source location 116*b*. If the second source location 116*b* maps to another location identifier, the computing device 110 can determine another filesystem corresponding to the other location identifier such that the second secret 102*b* is stored in the other filesystem. Including multiple filesystems in the physical server 106 can organize the secrets 102*a-b* stored in the physical server 106 to reflect topology of the cloud environments 104*a-b* while fulfilling the cryptographic requirement 128 for each secret based on the location identifier 118.

Once the computing device 110 determines that the second source location 116*b* maps to the location identifier 118, the computing device 110 can store the second secret 102*b* with an incremented version number 136 in the filesystem 122. For instance, the computing device 110 may store the first secret 102*a* with a version number of one and the second secret 102*b* with the incremented version number 136 of two. In some examples, an increment of the incremented version number 136 may be one. Alternatively, the increment of the incremented version number 136 may be a decimal or more than one.

While FIG. 1 depicts a specific arrangement of components, other examples can include more components, fewer components, different components, or a different arrangement of the components shown in FIG. 1. For instance, in other examples, the computing device 110 may be coupled to only one cloud environment or more than two cloud environments. Additionally, any component or combination of components depicted in FIG. 1 can be used to implement the process(es) described herein.

Figure 2:
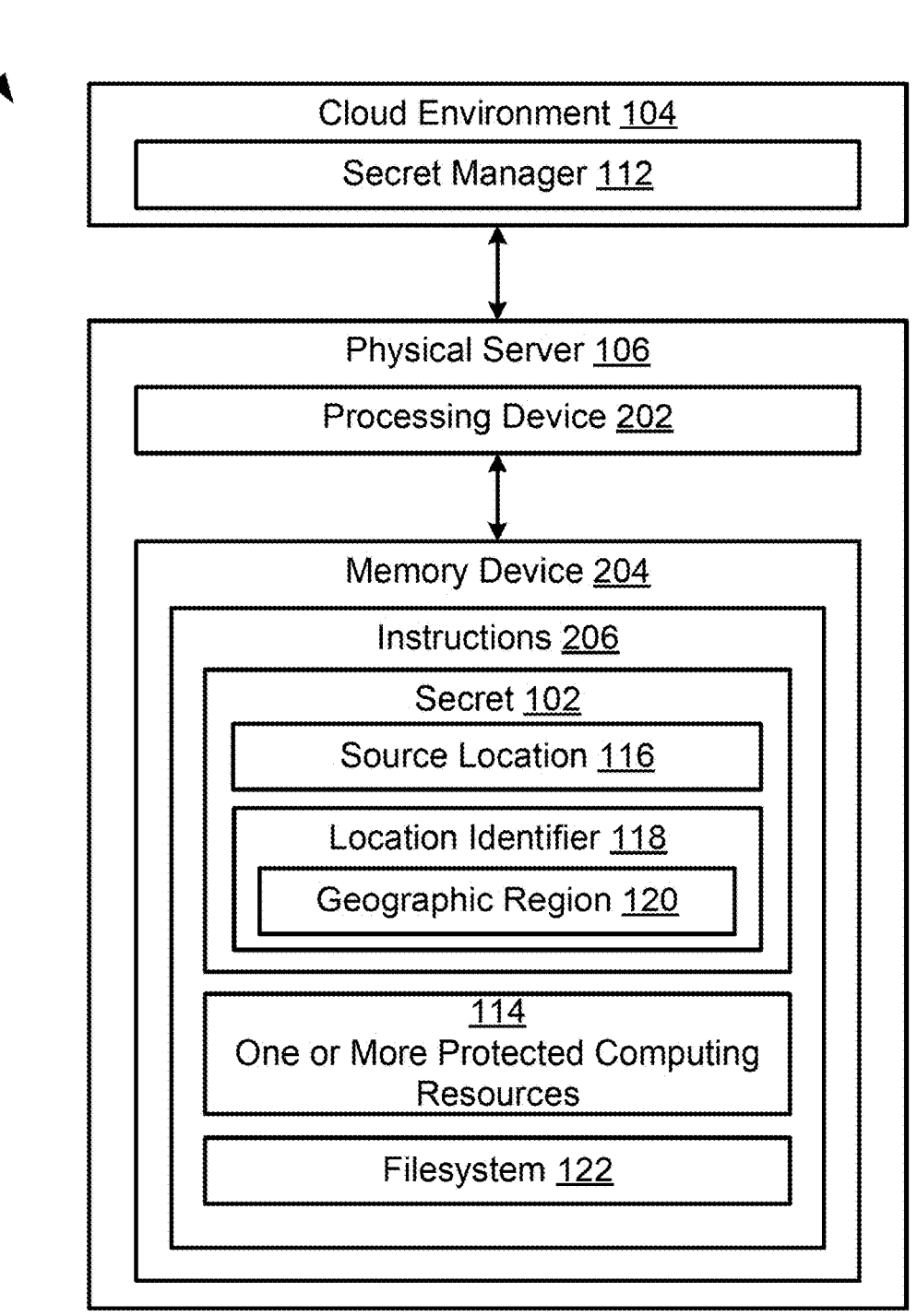
FIG. 2 is a block diagram of another example of a computing environment for migrating a secret from a cloud environment to a local system according to one example of the present disclosure.

FIG. 2 is a block diagram of another example of a computing environment for migrating a secret 102 from a cloud environment 104 to a local system according to one example of the present disclosure. The computing environment 200 can include a physical server 106 containing a processing device 202 communicatively coupled to a memory device 204. The physical server 106 can be communicatively coupled to the cloud environment 104 to migrate the secret 102 from the cloud environment 104 to the physical server 106. Migrating the secret 102 can involve removing the secret 102 from the cloud environment 104 once the secret 102 is stored in the physical server 106.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EE-PROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can migrate the secret 102 stored in the cloud environment 104 to the physical server 106 such that the secret 102 is stored in a filesystem 122 of the physical server 106. The processing device 202 can receive the secret 102 from a secret manager 112 associated with the cloud environment 104. Once the processing device 202 has received the secret 102 from the secret manager 112, the processing device 202 can identify a source location 116 associated with the secret 102. Specifically, the source location 116 can be an originating geographic location associated with the secret 102. Additionally, the source location 116 can map to a location identifier 118 that represents a geographic region 120 including the source location 116 of the secret 102. For example, a secret 102 originating in Australia may be associated with an Asia-Pacific (APAC) location identifier.

Using the location identifier 118, the processing device 202 can determine that the filesystem 122 in the physical server 106 corresponds to the location identifier 118 of the secret 102. The processing device 202 then can pass the secret 102 to the filesystem 122 of the physical server 106 to store the secret 102 in the filesystem 122 that corresponds to the location identifier 118. The secret 102 can be used to access one or more protected computing resources 114. In some examples, the processing device 202 can identify a software application 130 that uses the secret 102 to access the protected computing resources 114. For example, the secret 102 can be used to activate authority (e.g., administrative privileges, etc.) to access protected services.

FIG. 3 is a flowchart of a process 300 for migrating secrets 102*a-b* from a cloud environment 104 to a local system according to one example of the present disclosure. The local system can be an on-premise computing system with a physical server 106 to store the secrets 102*a-b*. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 receives a secret 102 stored in a cloud environment 104 from a secret manager 112 associated with the cloud environment 104. For example, the processing device 202 may receive an access credential from the secret manager 112. In some examples, the processing device 202 may receive more than one secret. For example, the processing device 202 can receive a list of secrets from the secret manager 112.

In block 304, the processing device 202 identifies a source location 116 associated with the secret 102. The source location 116 of the secret 102 can be predefined, for example when creating the secret 102 in the cloud environment 104. The source location 116 can be mapped to a location identifier 118 representing a geographic region 120 that includes the source location 116 of the secret 102. For example, the access credential may have been created in Germany, causing the access credential to be regulated by regulations set by European jurisdictions.

In block 306, the processing device 202 determines that a filesystem 122 in a physical server 106 corresponds to the location identifier 118 of the secret 102. The filesystem 122 can be used to store the secret 102 in the physical server 106. If the filesystem 122 is not present in the physical server 106, the processing device 202 may generate the filesystem 122 in the physical server 106 to store the secret 102. Once the processing device 202 generates the filesystem 122, the processing device 202 can map the physical server 106 to the location identifier 118 of the secret 102.

In block 308, the processing device 202 stores the secret 102 in the filesystem 122 of the physical server 106. The secret 102 can be used to control access to one or more protected computing resources 114. Examples of the protected computing resources 114 can include sensitive information associated with tools, applications, or containers. Once the secret 102 is stored in the filesystem 122, a configuration 132 of a software application 130 can be modified to use the secret 102 stored in the filesystem 122. For example, the processing device 202 can modify source code of the software application 130. Additionally or alternatively, the secret 102 may be removed from the cloud environment 104 once the secret 102 is stored in the filesystem 122.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device including instructions that are executable by the processing device for causing the processing device to perform operations comprising:
      receiving a secret stored in a cloud environment from a secret manager associated with the cloud environment, the cloud environment configured to store the secret in a storage resource to which a geographic location is assigned;
      identifying a source location associated with the secret, the source location of the secret corresponding to the geographic location of the storage resource in the cloud environment;
      determining, using a lookup table and the source location, a location identifier corresponding to the source location, the location identifier representing a geographic region comprising the source location of the secret;
      determining whether a filesystem corresponding to the location identifier of the secret is present in a physical server of an on-premises computing environment, the physical server comprising a plurality of filesystems, wherein each filesystem of the plurality of filesystems is associated with a respective location identifier representing a respective geographic region; and
      in response to determining that the filesystem in the physical server of the on-premises computing environment corresponds to the location identifier of the secret, storing the secret in the filesystem of the physical server, the secret comprising a privileged credential used to control access to one or more protected computing resources.

2. The system of claim 1, wherein the operations further comprise, subsequent to identifying the source location of the secret:
   in response to determining that the physical server lacks the filesystem corresponding to the location identifier of the secret, generating the filesystem in the physical server such that the filesystem is mapped to the location identifier of the secret.

3. The system of claim 1, wherein the secret is a first secret stored in a first cloud environment managed by a first secret manager, and wherein the operations further comprise:
   receiving a second secret from a second secret manager different from the first secret manager, wherein the second secret is stored in a second cloud environment separate from the first cloud environment;
   determining that the second secret is a duplicate of the first secret by comparing a first hash of the first secret to a second hash of the second secret;
   identifying a second source location associated with the second secret, the second source location being mappable to the location identifier corresponding to the filesystem; and
   storing the second secret with an incremented version number in the filesystem of the physical server subsequent to determining that the second secret is the duplicate of the first secret.

4. The system of claim 1, wherein the operations further comprise, subsequent to storing the secret in the filesystem:

identifying a software application configured to use the secret to access the one or more protected computing resources; and modifying a configuration of the software application to use the secret stored in the filesystem of the physical server, wherein the secret is configured to be removed from the cloud environment subsequent to storing the secret in the filesystem.

5. The system of claim 1, wherein the operations further comprise:

identifying an encryption key used to encrypt the secret stored in the cloud environment; and prior to storing the secret in the filesystem of the physical server, encrypting the secret using the encryption key.

6. The system of claim 1, wherein the operations further comprise, subsequent to identifying the source location of the secret:

identifying a rule set associated with the source location, wherein the rule set defines a cryptographic requirement corresponding to the source location.

7. The system of claim 6, wherein the operations further comprise:

using the rule set to determine an encryption key to encrypt the secret prior to storing the secret in the filesystem; and encrypting the secret using the encryption key to fulfill the cryptographic requirement defined by the rule set.

8. A method comprising:

receiving a secret stored in a cloud environment from a secret manager associated with the cloud environment, the cloud environment storing the secret in a storage resource to which a geographic location is assigned;

identifying a source location associated with the secret , the source location of the secret corresponding to the geographic location of the storage resource in the cloud environment;

determining, using a lookup table and the source location, a location identifier corresponding to the source location, the location identifier representing a geographic region comprising the source location of the secret;

determining whether a filesystem corresponding to the location identifier of the secret is present in a physical server of an on-premises computing environment, the physical server comprising a plurality of filesystems, wherein each filesystem of the plurality of filesystems is associated with a respective location identifier representing a respective geographic region; and in response to determining that the filesystem in the physical server of the on-premises computing environment corresponds to the location identifier of the secret, storing the secret in the filesystem of the physical server, the secret comprising a privileged credential used to control access to one or more protected computing resources.

9. The method of claim 8, further comprising, subsequent to identifying the source location of the secret:

in response to determining that the physical server lacks the filesystem corresponding to the location identifier of the secret, generating the filesystem in the physical server such that the filesystem is mapped to the location identifier of the secret.

10. The method of claim 8, wherein the secret is a first secret stored in a first cloud environment managed by a first secret manager, and wherein the method further comprises:

receiving a second secret from a second secret manager different from the first secret manager, wherein the second secret is stored in a second cloud environment separate from the first cloud environment;

determining that the second secret is a duplicate of the first secret by comparing a first hash of the first secret to a second hash of the second secret;

identifying a second source location associated with the second secret, the second source location being mappable to the location identifier corresponding to the filesystem; and storing the second secret with an incremented version number in the filesystem of the physical server subsequent to determining that the second secret is the duplicate of the first secret.

11. The method of claim 8, further comprising, subsequent to storing the secret in the filesystem:

identifying a software application configured to use the secret to access the one or more protected computing resources; and modifying a configuration of the software application to use the secret stored in the filesystem of the physical server, wherein the secret is removed from the cloud environment subsequent to storing the secret in the filesystem.

12. The method of claim 8, further comprising:

identifying an encryption key used to encrypt the secret stored in the cloud environment; and prior to storing the secret in the filesystem of the physical server, encrypting the secret using the encryption key.

13. The method of claim 8, further comprising, subsequent to identifying the source location of the secret:

identifying a rule set associated with the source location, wherein the rule set defines a cryptographic requirement corresponding to the source location.

14. The method of claim 13, further comprising:

using the rule set to determine an encryption key to encrypt the secret prior to storing the secret in the filesystem; and encrypting the secret using the encryption key to fulfill the cryptographic requirement defined by the rule set.

15. A non-transitory computer-readable medium comprising program code executable by a processing device for causing the processing device to perform operations comprising:

receiving a secret stored in a cloud environment from a secret manager associated with the cloud environment, the cloud environment configured to store the secret in a storage resource to which a geographic location is assigned;

identifying a source location associated with the secret , the source location of the secret corresponding to the geographic location of the storage resource in the cloud environment;

determining, using a lookup table and the source location, a location identifier corresponding to the source location, the location identifier representing a geographic region comprising the source location of the secret;

determining whether a filesystem corresponding to the location identifier of the secret is present in a physical server of an on-premises computing environment, the physical server comprising a plurality of filesystems, wherein each filesystem of the plurality of filesystems is associated with a respective location identifier representing a respective geographic region; and in response to determining that the filesystem in the physical server of the on-premises computing environment corresponds to the location identifier of the secret, storing the secret in the filesystem of the physical server, the secret comprising a privileged credential used to control access to one or more protected computing resources.

16. The non-transitory computer-readable medium of claim 15, wherein the operations further comprise, subsequent to identifying the source location of the secret:

in response to determining that the physical server lacks the filesystem corresponding to the location identifier of the secret, generating the filesystem in the physical server such that the filesystem is mapped to the location identifier of the secret.

17. The non-transitory computer-readable medium of claim 15, wherein the secret is a first secret stored in a first cloud environment managed by a first secret manager, and wherein the operations further comprise:

receiving a second secret from a second secret manager different from the first secret manager, wherein the second secret is stored in a second cloud environment separate from the first cloud environment;

determining that the second secret is a duplicate of the first secret by comparing a first hash of the first secret to a second hash of the second secret;

identifying a second source location associated with the second secret, the second source location being mappable to the location identifier corresponding to the filesystem; and storing the second secret with an incremented version number in the filesystem of the physical server subsequent to determining that the second secret is the duplicate of the first secret.

18. The non-transitory computer-readable medium of claim 15, wherein the operations further comprise, subsequent to storing the secret in the filesystem:

identifying a software application configured to use the secret to access the one or more protected computing resources; and modifying a configuration of the software application to use the secret stored in the filesystem of the physical server, wherein the secret is configured to be removed from the cloud environment subsequent to storing the secret in the filesystem.

19. The non-transitory computer-readable medium of claim 15, wherein the operations further comprise:

identifying an encryption key used to encrypt the secret stored in the cloud environment; and prior to storing the secret in the filesystem of the physical server, encrypting the secret using the encryption key.

20. The non-transitory computer-readable medium of claim 15, wherein the operations further comprise, subsequent to identifying the source location of the secret:

identifying a rule set associated with the source location, wherein the rule set defines a cryptographic requirement corresponding to the source location.

* * * * *